United States Patent [19]
Frederick

[11] 3,745,388
[45] July 10, 1973

[54] AXIAL AIR GAP MOTOR

[76] Inventor: Dean M. Frederick, 722 Ridge Road, Orange, Conn. 06477

[22] Filed: Aug. 11, 1971

[21] Appl. No.: 170,720

[52] U.S. Cl. ............... 310/49, 310/68 D, 310/264, 318/696
[51] Int. Cl. ............................................. H02k 37/00
[58] Field of Search................... 310/49, 46, 268, 310/162, 68, 68 D; 318/138, 685, 696

[56] References Cited
UNITED STATES PATENTS

| 3,005,118 | 10/1961 | Ranseen | 310/46 |
| 2,993,159 | 7/1961 | Devol | 310/46 |
| 3,430,083 | 2/1969 | O'Regan | 318/696 |
| 3,626,269 | 12/1971 | Stanley | 310/49 |
| 2,797,346 | 6/1957 | Ranseen | 310/46 |
| 3,504,253 | 3/1970 | Kavanaugh | 310/49 |
| 3,344,378 | 9/1967 | Wilhelmson | 310/49 |
| 3,001,121 | 9/1961 | Kerr | 310/68 D |
| 3,567,978 | 3/1971 | Parker | 310/268 |

*Primary Examiner*—R. Skudy
*Attorney*—John B. Sowell

[57] ABSTRACT

An axial air gap motor for A.C. or D.C. operation having a disc-shaped non-magnetic rotor supporting a plurality of equally spaced ferro-magnetic pole pieces therein, and a C-shaped stator comprising a plurality of individual pole pieces greater in number than the rotor pole pieces selectively energized to attract the displaced rotor pole pieces into alignment with the stator pole pieces.

6 Claims, 9 Drawing Figures

PATENTED JUL 10 1973 3,745,388
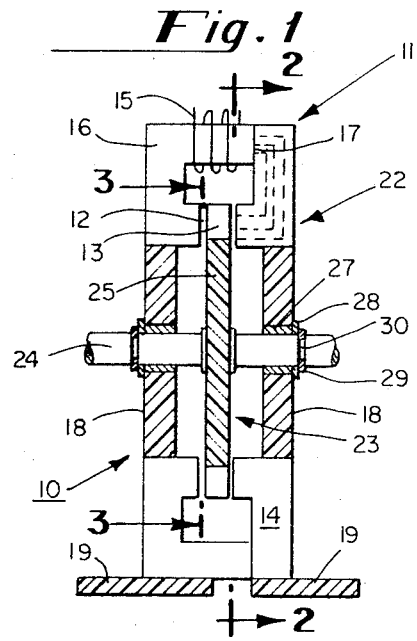
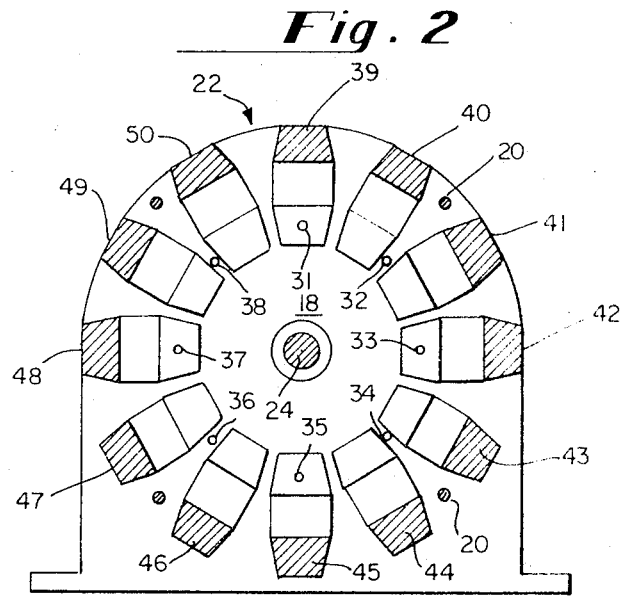
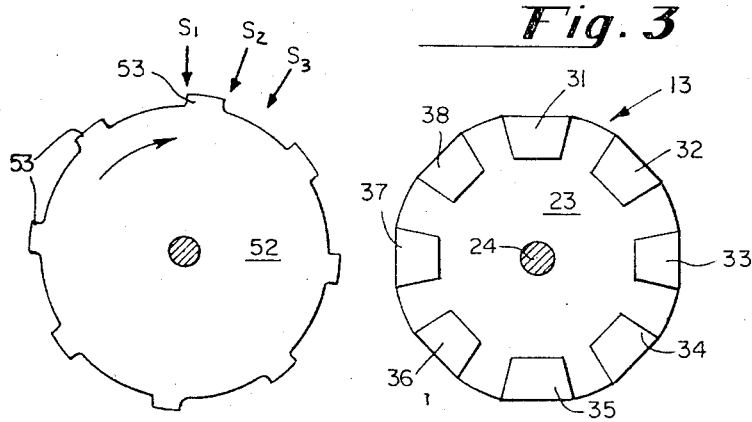
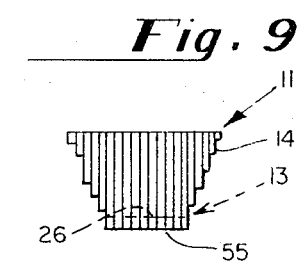
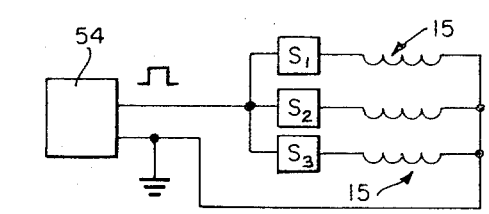
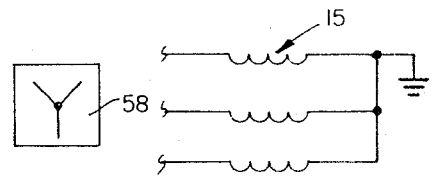
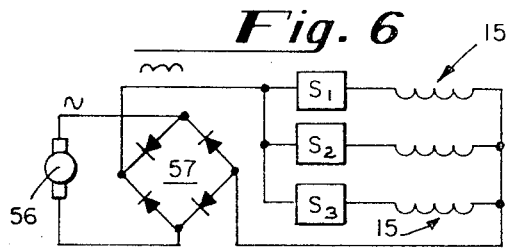
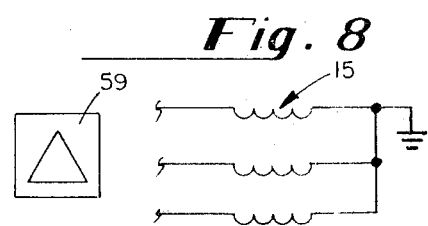
INVENTOR.
DEAN M. FREDERICK
BY John B. Sowell
ATTORNEY.

AXIAL AIR GAP MOTOR

BACKGROUND OF THE INVENTION

The theory and operation of A.C. and D.C. eletric motors is well known. Most electric motors are generally classified as A.C. and/or D.C. motors and are further classified by operating function, structural features or their intended use. The motor of the present invention is no exception and may be identified as operating on either A.C. or D.C. The operating function depends on whether the motor is wired for A.C. or D.C. operation as a motor or is wired to produce a generated D.C. signal. Structurally, the stator windings are C-shaped to permit a disc-shaped rotor to be operably mounted in the axial air gap.

Heretofore, disc rotor electrical machines were principally made for special purposes such as step-to-step motors, synchronous clock motors, printed circuit motors, shaded pole motors and tachometer generators, etc. Seldom were such motors competitive with low priced A.C. or D.C. drive motors. The present disc rotor motor is capable of performing the same special purpose operations and is both cheaper and better for numerous A.C. and D.C. drive motor operations.

SUMMARY OF THE INVENTION

It is a primary object of the present invention to provide an axial air gap motor which may be externally, or internally, wired for operation as a step-to-step motor, a D.C. motor, an A.C. motor or as numerous other electrical devices.

It is a further object of the present invention to provide a high efficiency low inertia motor.

It is another object of the present invention to provide a motor of high torque and power relative to its size and weight which is cheap to manufacture.

It is another object of the present invention to provide a motor having a high torque to inertia ratio.

It is yet another object of the present invention to provide a motor structure susceptible to production by automated machines.

Accordingly there is provided a light weight frame for supporting a first plurality of equally spaced individually wound electro magnetic stator pole pieces having a C shape, a non-conducting disc-shaped rotor for supporting a second plurality of ferro magnetic rotor pole pieces lesser in number than said first plurality of stator pole pieces, and means for sequentially energizing selective ones of said electro magnetic stator pole pieces equally spaced from each to provide a rotating stator field effect.

These and other objects and advantages of the invention will become more apparent with reference to the following specification and claims and the appended drawings wherein:

BRIEF DESCRIPTION OF THE DRAWINGS

FIG. 1 is an elevation of a preferred embodiment axial air gap motor.

FIG. 2 is a section in elevation of the stator pole pieces taken at lines 2—2 of FIG. 1.

FIG. 3 is a section in elevation of the rotor pole pieces taken at lines 3—3 of FIG. 1.

FIG. 4 is a schematic diagram of a timing cam of the type operable by the rotor shaft.

FIG. 5 is a schematic wiring diagram showing the stator field winding connections for a D.C. pulse source.

FIG. 6 is a schematic wiring diagram showing the stator field winding connections for D.C. operation from an A.C. source.

FIG. 7 is a schematic wiring diagram showing the stator field winding connections for a three phase A.C. Wye connected source.

FIG. 8 is a schematic wiring diagram showing the stator field winding connections for a three phase A.C. Delta connected source.

FIG. 9 is an enlarged cross section of a wedge-shaped pole piece.

DESCRIPTION OF THE PREFERRED EMBODIMENT

FIGS. 1 and 2 show sections through an axial air gap motor 10 as employed in both A.C. and D.C. operations. Stator pole pieces 11 are C-shaped having an air gap 12 sufficiently wide to accommodate the rotor pole pieces 13. Stator pole pieces 11 are preferably made from electrical grade low hysteresis loss sheet steel and formed as a well-known stack or laminate. By cutting the width of the outside C-shaped laminates 14 smaller than the center sections a wedge-shape is achieved as shown, enabling the radially inner section of the stator pole pieces to occupy the maximum cross section area and still maintain separation. Stator pole pieces 11 may be a stack of C-shaped laminates 14 or may be made from two stacks of L-shaped laminates. Winding 15 is more easily applied to leftmost L-shaped stack 16 when the air gap or split 17 is present. Automatic coil winders are capable of winding either shape.

Stator pole pieces 11, shown in FIG. 2, are equally spaced apart and supported by a plastic side frame 18. When the stator pole pieces 11 are made in two or more pieces, the plastic frame 18 is more easily made in two separate parts. Techniques for casting and molding plastic are well-known, accordingly it will be understood that pole pieces 11 may be made separately then arranged in their desired final arrangement to be secured in place when the side frames 18 are made. Preferably the plastic employed is a high strength, high impact and temperature resistant non-conducting plastic such as the well-known epoxy resins. New moldable thermosetting plastics are available which are adaptable to production of the present motor. Base 19 may be made integral with the side frames 18 or may be made separately and affixed thereto. When made as a separate piece, there is no requirement that base 19 be made of plastic or the same plastic, thus, wide latitude in the selection of base materials is permitted without affecting the electrical operation and efficiency of the preferred embodiment motor 10.

Connection points 20 are shown in stator frame 18. After the stator pole pieces 11 are affixed in separate side frames 18, conventional fastening devices, not shown, may be employed to hold the two parts which form a stator structure 22 together.

Rotor 23 comprises a shaft 24 having a non-conductive rotor disc 25 affixed thereto for supporting thereon a plurality of equally spaced rotor pole pieces 13. In the preferred embodiment shown in FIGS. 1 and 3 rotor pole pieces 13 are preferably made from electrical grade low hysteresis loss sheet steel and formed as a well-known stack or laminate similar to the stator pole pieces 11 shown in FIGS. 2 and 9. The area of the stator and rotor pole pieces are preferably the same, however, the depth of the rotor pole piece 11 may be less than that of the stator pole pieces as shown in FIGS. 1 and 9 (at line 26) for reasons that will be explained hereinafter. The flux path in the stator pole piece causes a north-south pole at air gap 12. Rotor pole pieces 13 are made of electro-magnetic or ferromagnetic material which is magnetized by the flux from the stator winding, but does not permanently retain the induced magnetism. Accordingly, the face of the rotor pole piece 13 juxtaposed the north pole of the stator pole piece 11 becomes a south pole and similarly, the opposite pole face of the rotor pole piece 13 becomes a north pole juxtaposed the south pole of the stator pole piece 11. Since the rotor and stator pole piece faces are opposite in polarity there exists a strong magnetic attraction between rotor and stator pole pieces which is equally balanced and tends to self-center the rotor 23 in the air gap 12. The strong centering force permits shaft 24 to be mounted in cheap bushing or bearings 27. Should the motor 10 be operated on its side or a thrust produced by the load, thrust washers 28 held by spring clips 29 fastened in grooves 30 of shaft 24 are provided. It will be understood that other forms of economical thrust and antifriction bearing may be employed.

In order to more clearly explain the operation of the motor, the eight rotor pole pieces 13 have been consecutively numbered 31 to 38 clockwise as shown in FIG. 3. The 12 stator pole pieces have been numbered 39 to 50 clockwise as shown in FIG. 2. The round dots in FIG. 2 represent the location of the center of the rotor pole pieces 13 relative to the stator pole pieces 11 when pole pieces 31 and 39 are aligned. Assuming that clockwise rotation of the rotor is desired in FIG. 2, stator pole pieces 41, 44, 47, 50 are simultaneously energized causing rotor pole pieces 32, 34, 36, 38 to rotate clockwise fifteen degrees into alignment therewith. Next stator pole pieces 40, 43, 46, 49 are simultaneously energized and all other stator pole pieces de-energized causing rotor pole pieces 31,33,35,37 to rotate clockwise 15° into alignment therewith. Rotor pole pieces 32, 34, 36, 38 have now rotated 30° and are moved clockwise when stator pole pieces 39, 42, 45, 48 are next energized and the other stator pole pieces de-energized. The sequence of switching causes 45° of rotation, accordingly, in the preferred embodiment shown, eight repetitions of switching causing one full rotation of the rotor. If the motor is to be operated on direct current, some form of mechanical or electrical switching must be provided. FIG. 4 shows schematically a cam plate 52 having eight actuating faces 53 thereon. Each face 53 is illustrated as occupying a segment of 15°. When driven direct by rotor shaft 24, cam plate 52 will sequentially actuate switches S1, S2, S3 and when connected to windings 15 of stator pole pieces 41, 44, 47, 50; 40, 43, 46, 49 and 39, 42, 45, 48 respectively, the motor will be driven in the manner described above. It will be understood that switches S1, S2 and S3 are shown schematic and that many well-known switch systems could be employed such as printed circuits, having brush followers, photo electric cell detectors, fast operating electro-mechanical switches, magnetic or electronic switches.

Axial air gap motor 10 may be operated as a stepper or step-to-step motor. FIG. 5 shows a source of D.C. pulses 54 each long enough in time to cause rotor 23 to step 15°. If the pulse remains on after 15° of rotation, the rotor is stopped because the energized stator pole pieces are still attracting the rotor pole pieces magnetized by either switch S1, S2 or S3. Since the rotor 23 is preferably made of high strength and low weight plastic and is very thin, it has a very low inertia, thus, enhancing its value as a stepper motor. As explained hereinbefore, the cross section area of rotor pole piece 13 may be made smaller than the area of the stator pole piece, thus causing the linking flux line to have high density at the narrow edge 55 of the rotor pole piece 13, shown in dotted lines in FIG. 9. The higher concentration of flux lines reduces transient seeking or damping which is further reduced by the low inertia rotor 13.

Preferably the air gap between stator and rotor pole pieces is made as small as possible without incurring an increase in manufacturing cost. It has been found that air gaps of one to two one-thousandths of an inch are feasible and flux densities of 90 kilolines per square inch in the stator pole pieces 11 are reduced less than 10 percent in the rotor pole pieces 13, thus insuring high electrical efficiency.

FIG. 6 shows an A.C. generator 56 connected to a full wave rectifier 57 to provide pulsating D.C. to the distribution switches S1, S2, S3, which are connected to the stator windings as explained above. When operating on direct current the C-shaped stator pole pieces 11 are being magnetized in the same direction so there is no flux reversal.

FIG. 7 shows schematically a connection to a Wye-connected three phase source 58. The three phases are electrically separated by 120° and produce a rotating. electrical field in the stator winding which is synchronized with the power source 58, thus, the rotor 23 will be driven in the same manner as an induction motor having a solid iron rotor, but because of the novel structure does not incur high losses in the rotor.

FIG. 8 shows schematically a connection to a Delta-connected three phase source 59 which is capable of producing a rotating field in the stator. Accordingly, rotor 23 will be driven as an induction motor as is well-known.

Each of the stator windings 15, when connected directly to an A.C. three phase source will reverse the polarity of the stator pole pieces 11 each cycle. As the stator pole pieces 11 reach their maximum flux density for either polarity they will induce the reverse polarity in the nearest rotor pole piece, thus attracting the pole pieces into alignment. Since the stator 18 presents a rotating field to the rotor 23 the rotor will attempt to follow or lock into synchronism with the rotating field.

Having explained the basic operation of a preferred axial air gap motor 10 having RPM on the rotor; and stator pole pieces 11 and eight rotor pole pieces 13 it will be understood that the motor 10 when connected to a 60 cycle source as shown in FIG. 5 will step or rotate 15° each time the stator pole piece 11 is energized, thus producing 900 RPM on the rotor. Similarly, combinations of six stator and four rotor pole pieces produce 1,800 RPM on the rotor; nine stator and six rotor pole pieces produce 1,200 RPM on the rotor, 18 stator and 12 rotor pole pieces produce 600 rpm on the rotor; and 24 stator and 16 rotor pole pieces produce 450 RPM on the rotor. As explained with respect to FIG. 5, an electronic pulse source 54 may be employed to obtain various cyclical pulse rates and to obtain varying RPM of the rotor if so desired. The speed at which the motor is driven by a pure D.C. source is dependent on the speed of switching as in FIG. 6.

When the novel axial air gap motor is connected direct to a three phase 60 cycle source as shown in FIGS. 7 and 8 the RPM of the rotor is driven in synchronism with the speed of the rotating field the same as explained with reference to FIG. 5, even though the power output and efficiency of operation is not as great.

Reversal of direction of rotation is accomplished by reversing the stator field winding as is well known in this art.

The motor of the present invention is not intended for very large power applications. However, because of the compact design several such motors may be applied to one shaft. Smooth operation is effected by displacing the rotor discs circumferentially one from the other to achieve pole piece alignment at different times. As shown in FIG. 1 the center portion of the stator is open to permit cooling. The side frames 18 and the rotor disc 25 may be apertured or vaned to induce air flow through the motor. Preferably the stator pole pieces are exposed at all surfaces except where they connect to the thin sheet shaped side frames 18. The motor of the present invention is by nature of its open structure cooler running than a squirrel cage motor, yet cheaper to build and fully as efficient on A.C. and more efficient on D.C. Thus, for low starting torque applications the motor may replace squirrel cage motors.

Having explained the preferred embodiment of the invention with reference to pole pieces of electrical grade sheet steel it should now be apparent that the rotor pole pieces may be slugs made of soft iron or powdered iron even though powdered iron is less efficient. If the motor is to be employed as a servo motor or tachometer generator, permanent magnet or electro magnetic rotor pole pieces must be provided to induce voltage in the stator windings 15. The connection of the stator windings 15 to a power source has been shown schematically and it will be understood that the windings may be connected in series or parallel to achieve varied desired results. Since the motor 10 operates synchronously with the rotating field it is possible to arrange the operation of the switches to have overlapping energization of stator pole pieces so as to achieve greater torque with a given motor. Other modifications known in other types of motors may be made without departing from the invention claimed.

I claim

1. An axial air gap motor for A.C. or D.C. operation of the type having a C-shaped stator, comprising in combination:
   a disc-shaped rotor of non-conductive plastic material,
   a plurality of equally spaced ferro magnetic rotor pole pieces mounted in said rotor and isolated one from the other,
   a stator having a plurality of equally spaced stator pole pieces mounted therein greater in number than the rotor pole pieces,
   each said stator pole piece comprising a C-shaped electro magnet straddling said rotor juxtaposed the rotor pole pieces and providing an axial air gap therebetween,
   a field winding on each said electro-magnet,
   and means for simultaneously energizing selected pole pieces of said plurality of stator pole pieces which are equally spaced from each other and equally displaced from selected rotor pole pieces, said selected rotor pole pieces being linked by the field of the stator pole pieces to attract said selected rotor and stator pole pieces into alignment with each other.

2. An axial air gap motor as set forth in claim 1 wherein said rotor disc comprises a moldable non-conducting plastic and said rotor pole pieces comprise electro-magnetic iron poles isolated one from the other in said plastic.

3. An axial air gap motor for A.C. or D.C. operation of the type having a C-shaped stator, comprising in combination:
   a disc-shaped rotor of non-conductive material,
   a plurality of equally spaced ferro-magnetic rotor pole pieces mounted in said rotor,
   a stator having a plurality of equally spaced stator pole pieces mounted therein greater in number than the rotor pole pieces,
   said stator comprising a non-conducting plastic material in which said stator pole pieces are isolated one from the other,
   each said stator pole piece comprising a C-shaped electro magnet straddling said rotor juxtaposed the rotor pole pieces and providing an axial air gap therebetween,
   a field winding on each side electro-magnet,
   and means for simultaneously energizing selected pole pieces of said plurality of stator pole pieces which are equally spaced from each other and equally displaced from selected rotor pole pieces, said selected rotor pole pieces being linked by the field of the stator pole pieces to attract said selected rotor and stator pole pieces into alignment with each other.

4. An axial air gap motor as set forth in claim 3 wherein said stator pole pieces and said rotor pole pieces each comprise a laminate of electrical sheet steel.

5. An axial air gap motor as set forth in claim 4 wherein the stator and rotor pole pieces are wedge-shaped in cross section to provide a maximum cross sectional area for magnetic flux to link the pole pieces.

6. An axial air gap motor as set forth in claim 1 wherein the means for simultaneously energizing selected pole pieces of said plurality of stator pole pieces comprises switch means connected in series between a D.C. pulse source and the field windings, and a full wave rectified A.C. power source for providing the D.C. pulse source whereby predetermined field windings are energized by said D.C. pulse source to move the rotor in synchronism with the switching of the switch means.

* * * * *